3,313,827
AMINO ALKYL ETHERS OF GRISEOFULVIN OXIME
Frank J. Villani, West Caldwell, N.J., assignor to Schering Corporation, Bloomfield, N.J., a corporation of New Jersey
No Drawing. Filed Dec. 29, 1964, Ser. No. 421,997
7 Claims. (Cl. 260—346.2)

This invention relates to compositions of matter identifiable as amino alkyl ethers of griseofulvin oxime and to processes for making and using such compositions.

The invention sought to be patented in its composition aspect is described as residing in the concept of a chemical compound having a molecular structure of griseofulvin oxime in which the hydrogen atom of the oximino portion has been replaced by the substituent "-lower alkylene-$NR_1R_2$," wherein $R_1$ and $R_2$ are members of the group consisting of lower alkyl and when taken together with the nitrogen atom to which they are attached form a heterocycle having 5–6 cyclic atoms, one of said cyclic atoms other than the nitrogen atom being selected from the group consisting of C, O, and N, all other cyclic atoms being carbon.

The invention sought to be patented in its process aspect is described as residing in the concept of preparing the tangible embodiments of the composition aspect by the reaction of griseofulvin with a substituted hydroxylamine, that is one of the formula $H_2NO$-loweralkylene-$NR_1R_2$.

The tangible embodiments of the composition aspect in their free base form possess the inherent general physical properties of being substantially insoluble in water, soluble in aqueous acid and moderately to fully soluble in common organic solvents. Included within the concept of the tangible embodiment of the composition aspect of this invention are the pharmaceutically acceptable non-toxic acid addition and quaternary salts of the novel amino-alkyl-oximino ethers. The acid addition and quaternary salts are soluble in water and lower alkanols. These compositions of matter are generally high melting white crystalline substances.

The tangible embodiments of this invention are thus compounds having the following structural formula:

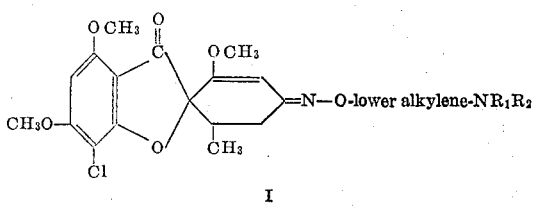

I including the non-toxic pharmaceutically acceptable acid addition and quaternary salts wherein -lower alkylene-$NR_1R_2$ is as above defined.

The tangible embodiments of the invention possess inherent applied use characteristics of increasing coronary blood flow as evidenced by pharmacological evaluation and are of value as anti-bacterial and anti-fungal agents. The tangible embodiments in the form of their acid addition and quaternary salts are used in preferance to the free bases in view of their water solubility. Indeed, the free bases are preferably used as intermediates for the preparation of the acid addition and quaternary salts.

Griseofulvin is a known antibiotic which has been shown to possess important anti-fungal properties. The amino alkyl ethers of griseofulvin oxime, disclosed and claimed herein, are similarly useful but possess the added advantage of being soluble in water or being able to be rendered soluble in water thus lending themselves to the preparation of aqueous pharmaceutical dosage forms.

As used herein, the term "lower alkylene" means a bivalent hydrocarbon radical including straight and branched chain radicals among which are ethylene, 1,3-propylene, 1,2-propylene, 1,4-butylene, 1,2-butylene, 1,3-butylene, 1,5-pentylene, 2-ethyl-1,3-propylene and the like. Further, as used herein, the term "—$NR_1R_2$" represents an amino group substituted by lower alkyl radicals including the straight and branched chain radicals among which are methyl, ethyl, propyl and the like as well as the obvious cyclic equivalents of such, as for example pyrrolidino, piperidino, morpholino and piperazino.

The tangible embodiments of this invention are prepared by reacting griseofulvin with a substituted hydroxylamine (an amino-alioxyamine). The substituted hydroxylamine reagent is preferably used in the form of its acid addition salt, such as in the form of a dihydrochloride and is prepared by methods well-known in the art. Exemplary of such known methods is the following general procedure which involves treating an acetone oxime (II) with a di-alkylaminoalkyl halide (dimethylaminoethyl chloride, III), in the presence of a base such as sodamide or sodium ethoxide. The dimethylaminoethyloximino derivative (IV) is isolated by distillation. Upon treatment with dilute acid, the oxime (IV) is hydrolyzed regenerating acetone and the substituted hydroxylamine dihydrochloride (V).

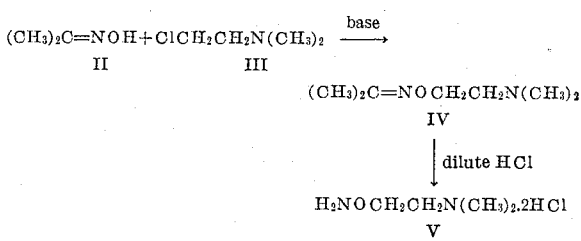

Other amino-alkoxyamines analogous to V, such as diethylaminoethoxyamine, piperidinoethoxyamine, morpholino-ethoxyamine and the like are prepared in a manner similar to that described above.

The substituted hydroxylamine reagent (V) is reacted with griseofulvin preferably in the presence of a tertiary base. It has been found that ethanol-pyridine affords a satisfactory solvent. Heating the mixture at reflux results in oximation of griseofulvin and the formation of a tangible embodiment of this invention in the form of an acid addition salt, namely the hydrochloride; that is a compound of Formula I wherein lower alkylene is —$CH_2CH_2$— and —$NR_1R_2$ is dimethylamino. This salt is transformed into its free base form by usual procedures involving use of a base and extracting solvents such as chloroform. The free base is generally purified by recrystallization and then transformed into the acid addition salt or quaternary salt of choice by the usual procedures for preparing such salts.

It will be apparent to one skilled in the art that the non-toxic pharmaceutically acceptable salts of the oximino ethers may be prepared by any of the conventional methods such as dissolving the free basic ether in an organic solvent in which the salt is not soluble and adding thereto an acid containing the desired anion. The precipitated salt is purified and recrystallized from solvents such as alcoholic ether. Representative of such salts are those formed with inorganic acids such as hydrochloric, sulfuric, hydrobromic and organic acids such as maleic, succinic, salicylic and the like. The quaternary salts are also prepared in a conventional manner by dissolving the basic ether in an organic solvent in which the quaternary salt is not soluble or is only partially soluble by adding thereto a quaternizing reagent such as an alkyl halide which will result in the formation of the particularly desired quaternary salt. The quaternary salts are generally soluble in water or are purified by crystallization from solvents such as alcohols.

Representative of the quaternizing agents which will give rise to pharmaceutically acceptable quaternary salts are for example alkyl halides, preferably methyl chloride, methyl bromide, methyl iodide and their ethyl analogs as well as their sulfates. The particular anion is not critical just so long as it is non-toxic and pharmaceutically acceptable as taught by the present state of the art.

The following preparations and examples are illustrative of the means by which the tangible embodiments of this invention are prepared.

PREPARATION OF OXIME REAGENT

Dimethylaminoethoxyamine dihydrochloride

Admix 73 g. acetone-oxime, 143 g. of dimethylaminoethyl chloride hydrochloride, 427 g. of anhydrous potassium carbonate and 1.5 l. benzene. Stir and reflux overnight. Cool, filter, and wash the precipitate with hot benzene. Combine filtrates, concentrate to a residue and distill in vacuo to obtain the dimethylaminoethyl ether of acetone-oxime (B.P. 85–88°/50 mm.).

Admix 100 g. of the ether obtained above and 1 liter of 10% aqueous hydrochloric acid. Stir on a steam bath for 15 hours. Concentrate to a residue in vacuo. Recrystallize the residue from methanol-ether solvent obtaining dimethylaminoethoxyamine dihydrochloride, M.P. 181–182.5° C.

By substituting other equivalent tertiary-aminoalkylchloride hydrochlorides for dimethylaminoethylchloride hydrochloride in the above preparation, the corresponding t-aminoalkoxyamine hydrochlorides are obtained. Accordingly, there may be prepared by this method oxime reagents exemplified by the following alkoxyamines. (It is understood that these reagents are prepared as above and are obtained in the form of their dihydrochloride salts): dimethylaminopropoxyamine, dimethylaminobutoxyamine, diethylaminoethoxyamine, diethylaminopropoxyamine, diethylaminoisopropoxyamine, diethylaminopentoxyamine, pyrrolidinoethoxyamine, pyrrolidinopropoxyamine, piperidinoethoxyamine, piperidinopropoxyamine, morpholinoethoxyamine, morpholinobutoxyamine, piperazinoethoxyamine, N-1-methyl-N-4-piperazinoethoxyamine and N-1-(hydroxyethyl)-N-4-propoxyamine.

EXAMPLE 1

Dimethylaminoethyl ether of griseofulvin oxime

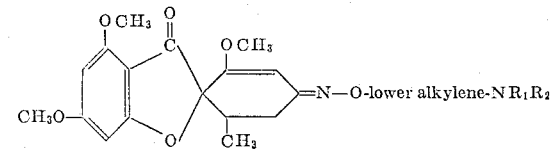

Heat a mixture of 15 g. of griseofulvin, 9.6 g. of β-dimethylaminoethoxyamine dihydrochloride, 450 ml. of ethanol and 90 ml. of pyridine for 6 hours while stirring. Remove the solvents in vacuo and dissolve the residue in water. Render the aqueous solution alkaline by the addition of ammonium hydroxide solution and extract the mixture with chloroform. Wash the chloroform layer thoroughly with water and concentrate to a residue. Triturate the residue with isopropyl ether obtaining the product of this example which upon purification by recrystallization from isopropyl ether has a melting point at 134–136° C.

Alternatively the purified product may be obtained by placing the crude product on a chromatographic column containing 300 g. of alumina and eluting with benzene ethyl acetate mixtures. Removal of the eluate solvent affords the product.

By substituting different oximinating agents in the foregoing procedure for the dimethylaminoethoxyamine dihydrochloride, the corresponding aminoalkoxy ethers are obtained. Representative of such oximinating agents are the following -oxyamine dihydrochlorides: dimethylaminoprop-, diethylaminoeth-, piperidinoprop-, pyrrolidinoeth-, piperidinoeth-, morpholinoeth-, piperazinoeth-, piperazinoprop-.

EXAMPLE 2

Dimethylaminoethyl ether of griseofulvin oxime hydrochloride

Dissolve 1 g. of the ether obtained in Example 1 in 50 ml. of anhydrous ether and bubble anhydrous hydrogen chloride through the chilled solution. The hydrochloride of this example precipitates as white crystals which are purified by recrystallization from ethanol-ether.

Other pharmaceutically acceptable acid addition salts of the compound of Example 1 and its analogs are prepared by this technique or other methods well known in the art.

EXAMPLE 3

Dimethylaminoethyl ether of griseofulvin oxime methyliodide

Dissolve 3 g. of the ether of Example 1 in 300 ml. of anhydrous ethyl and add 2 ml. of methyliodide. Allow to stand at room temperature over night. Filter and recrystallize from ethanol, M.P. 221–224° C.

Other quaternary salts of the compound of Example 1 and its analogs are prepared in an analagous manner utilizing a quaternizing agent described herein.

I claim:
1. A member of the group consisting of amino compounds of the formula:

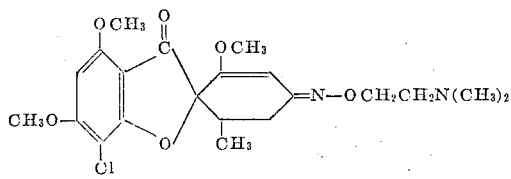

and the non-toxic pharmaceutically acceptable acid addition and quaternary salts thereof wherein $R_1$ and $R_2$ are members of the group consisting of lower alkyl and when taken together with the nitrogen atom to which they are attached form a member of the group consisting of pyrrolidino, piperidino, morpholino and piperazino.

2. A free amino compound of claim 1.
3. A non-toxic pharmaceutically acceptable acid addition salt of a compound of claim 2.
4. A non-toxic pharmaceutically acceptable quaternary ammonium salt of a compound of claim 2.
5. A compound of claim 2 being the dimethylaminoethyl ether of griseofulvin oxime of the formula:

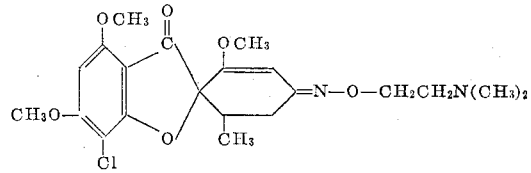

6. The hydrochloride of the compound of claim 5.
7. The methyl iodide of the compound of claim 5.

No references cited.

ALEX MAZEL, *Primary Examiner.*

HENRY R. JILES, *Assistant Examiner.*